No. 727,797. PATENTED MAY 12, 1903.
W. HOFFMAN.
CLASSIFIER.
APPLICATION FILED APR. 4, 1902.
NO MODEL. 3 SHEETS—SHEET 2.

Witnesses
Inventor
Wm. Hoffman
By Benj. R. Catlin
Attorney

No. 727,797. PATENTED MAY 12, 1903.
W. HOFFMAN.
CLASSIFIER.
APPLICATION FILED APR. 4, 1902.
NO MODEL 3 SHEETS—SHEET 3.

Witnesses
Inventor
Wm. Hoffman
By Benj. R. Catlin
Attorney

No. 727,797. Patented May 12, 1903.

UNITED STATES PATENT OFFICE.

WILLIAM HOFFMAN, OF SALT LAKE CITY, UTAH.

CLASSIFIER.

SPECIFICATION forming part of Letters Patent No. 727,797, dated May 12, 1903.

Application filed April 4, 1902. Serial No. 101,422. (No model.)

*To all whom it may concern:*

Be it known that I, WILLIAM HOFFMAN, a resident of Salt Lake City, in the county of Salt Lake and State of Utah, have invented certain new and useful Improvements in Classifiers; and I do hereby declare the following to be a full, clear, and exact description of the invention, such as will enable others skilled in the art to which it pertains to make and use the same.

My invention relates to the classification of minerals, ores, or other bodies or substances capable of similar classification, the object of the improvement being to provide a comparatively simple, inexpensive, and practical appliance by means of which the substances under treatment may be expeditiously and effectively sorted into separate and distinct classes by the employment of the law of equal falling particles, this law being that bodies falling freely in a fluid fall at a speed proportional to the weight divided by the resistance. Bodies that fall freely in a fluid give us three principal results: first, when the bodies are of different sizes and different specific gravities it happens that generally smaller bodies of greater specific gravity fall in equal velocity with larger bodies of lesser specific gravity; second, and where the bodies thus falling are of equal size and like shape then only will fall with equal velocity the bodies of equal specific gravity; third, and where the bodies thus falling are of equal specific gravity and like shape then they will fall in equal sizes. These cases are all strictly classifications: first, classes of equal falling particles of differing sizes and differing specific gravities; second, classes of equal falling particles of equal sizes and differing specific gravities; third, classes of equal falling particles of differing sizes and equal specific gravities.

As understood among miners, the first class is classification, the second is concentration, and the third is sizing. My apparatus gives these three results, and is thus a combined classifier, concentrator, and sizer.

Hydraulic classification is generally effected by streams of water of differing velocities, the particles of the pulp being submitted to the action of the streams in such manner that they shall become separated from the pulp-stream according to their respective powers to resist the force of the different velocities. The difference of velocities is usually produced by an adjusting-cock, which turns on more or less water, or by changing the head of water; but the greatest saving of time and cost of classification can be obtained only by a continuous use of the full power of the stream, and then the velocities can be made to differ only by retardations produced by intermediate enlargements of the stream. It is on this latter principle that my apparatus is constructed.

I illustrate my apparatus principally as a water ore-classifier, it being understood that air or any other suitable fluid may be used instead of water.

Generally speaking, my invention contemplates the provision of classifying-tanks of novel construction connected by pipes in novel application and combination, through which tanks and pipes is made to flow a pulp-stream and fluid under continuous and high pressure. The apparatus is so constructed and proportioned that the tanks in succession shall take out of and separate from the pulp-stream and make separately available a certain class of the constituents of the pulp-stream, each tank taking out a separate predetermined class.

In most hydraulic classifiers the fall is too short to allow of complete separation of the equal falling classes. My apparatus avoids this difficulty entirely, and in old classifiers the fall is retarded by the friction of the particles upon one another. My apparatus reduces said friction to a minimum.

When the pulp can be sifted into uniform sizes, it is thereafter comparatively easy to separate the mineral from the gangue. In all such cases my apparatus operates as the most perfect of concentrators. The greatest difficulty is met when the pulp is too fine for further practical sizing by means of sieves, and it is then that nothing but a classifier will serve. When the ore has been passed through the finest practical sieve, there remains a great range in the sizes of the particles; but nevertheless it has even here become sized for my purpose as to its larger particles, and here my apparatus will produce a practically perfect separation in its first classes of product. These classes will contain only the pure mineral in the larger sizes, and I here obtain a better product than can be gotten from any concentrating-table. The next classes of product will be part pure mineral and part combined gangue and mineral and will carry no pure gangue and will range from as good to better than a concentrating-table product, and it will be only my final classes that can be improved by usual concentrating processes. The value of classifying here is that the range of sizes is decreased. Where pulp ranges in size from a particle of impalpable dust to a particle of, say, one thousand such volumes, then when the concentrating-table is adjusted to throw off the larger pieces of gangue it will by the same adjustment throw off the smaller pieces of mineral, and this can only be avoided by a classification that divides the large range of sizes into several or many small ranges. The greater the difference in specific gravity of any two substances to be separated the greater will be the range of sizes in the particles of each class. Thus if the ore should be free gold in quartz there would be a very long range of sizes between the particle of pure gold and the particle of pure quartz that would fall equally with the gold, while with chalcopyrite and quartz we would have but a short range, and it is where these ranges are shortest, where the difference in specific gravities is smallest, where the separation is the most difficult, it is just in such cases that the values can be saved only by the most perfect classification.

The greater the number of classes within practical limits the better will be the results obtained. The duty of each concentrating-table is thus lightened and the separation made cleaner, for not only is the range of size of material to be treated by any one machine thus decreased, but the heavy pure mineral in each class is confined entirely to the smaller particles and the purest gangue present to the larger, with a combined mineral and gangue ranged in between in sizes relative to the proportions of mineral and gangue present. In ores adapted to such concentration the smallest particles will always be of the heaviest specific gravity and of pure mineral, while the largest particles will be of the lightest specific gravity, though not necessarily of pure gangue.

In the operation of any crushing-machine, however coarse the average size of the product may be, there is produced a considerable portion of "fines," the proportion increasing rapidly as the crushing-faces of the machine are brought closer together. These fines are made up of particles varying in size from fine sand to impalpable dust or "slime." In character they are like the original ore, a mixture of gangue and mineral, the only difference being that the more brittle portion of the ore, usually the mineral sought, is present in larger proportions, as its brittleness tends to make it break up fine. The tougher gangue stays in larger lumps. This makes it of high importance that these fines should be saved. This question of fines and slimes is always a most important problem, and often brittle minerals can be profitably saved only by successive reduction and separation. Every time the ore is passed through any kind of crusher there will be particles of pure mineral of various sizes freed from the gangue. These particles are then finished and should not be crushed again. They should be concentrated out at this stage. If, instead, they are again put through the crusher, each crushing will multiply fines and slimes, a large percentage of which cannot be recovered. For such cases my apparatus is particularly fitted on account of the speed and perfection of its work. Here it acts as a concentrator, when two tanks will generally be sufficient. The material is screen-sized after each crushing, and each size is then separately put through these two tanks. The smaller tank as adjusted takes out headings for the smelter, the larger tank takes out middlings to be recrushed, and the adjustment causes the discharged stream to carry off barren tailings. Of course absolute perfection is here out of the question. There is always, at best economically, more or less loss of mineral in concentrating. The limit to which concentration may be profitably carried is the point beyond where the cost of concentration, together with the inevitable loss in tailings, exceeds the saving in freight and the treatment charges. My apparatus is easily adjustable to any degree of fine work, and the operator needs but to determine the percentage of gangue to be left in the headings and of mineral to go with the tailings. When the pulp has thus been by successive reduction worked down to the finest practical sieve, the undersize from that sieve is run through a full battery of my apparatus then acting as a classifier. Here, again, I obtain a class of finished headings, while the remaining classes are now in best obtainable condition for further treatment by usual methods.

In some ores there is not sufficient difference in the constituents to allow a practical separation by their specific gravities, and in some ores the constituents are so intimately combined that no crushing whatever can separate the mineral from the gangue and that, however crushed, the particles, large and small, will all remain of the same specific gravity. In such or approximating cases the separation is made chemically—as, for instance, by cyaniding—and then my apparatus acts as a sizer, when by using the entire battery a single operation produces quickly and cheaply a full series of clean and practically perfect sizes.

Referring to the drawings.

Figures 1, 4, 5, 8:
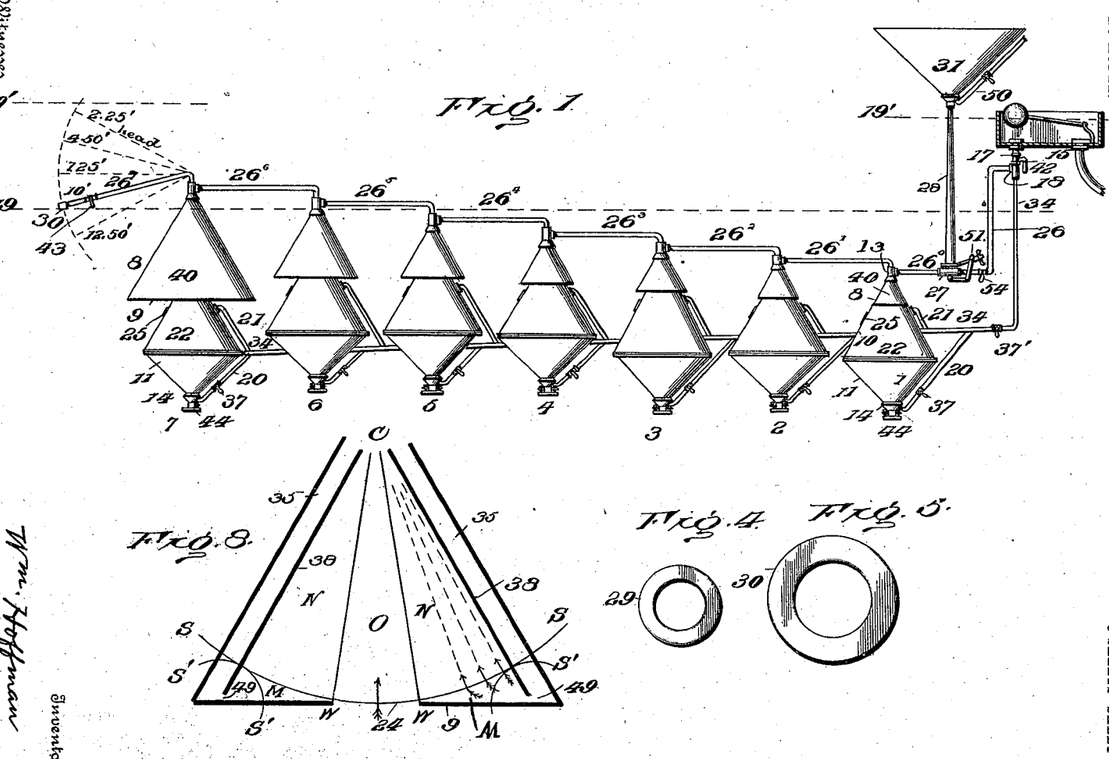
Figure 1 is an elevation of a serial group of classifying-tanks with hopper and water-supply tank embodying my invention.
Fig. 4 is a side view of the head-disk 29.
Fig. 5 is a side view of the foot-disk 30.
Fig. 8 illustrates diagrammatically the convex shape of the separating area S, whose shape is controlled by the efflux at C. S' is the corresponding area, whose shape is controlled by the influx at 49.

Referring to the diagram Fig. 8, M indicates a space in a classifier-tank where the current velocity is less than on arc S. The velocity here is the minimum velocity of the tank, and this space gives the best effect of gravitation. The triangular spaces N N and the clear cone O within show the relative parts of the pulp-stream and the clear stream as they go to constitute the total flow. These streams do not mingle within the tank. They flow side by side, increasing in velocity as they contract in area. The clear stream flows upward from opening 24, conforming to the shape of the conical wall or part 38. The pulp-stream flows laterally out of opening 49 in general toward the center of the table, spreading from a horizontal along the table to a sixty-degree altitude along part 38. Both streams cross the separating area, on all points of which the current is of equal velocity. The pulp-stream carries off the lighter portions of the pulp and forces the heavier particles along the table to and over 24 at right angles to the clear stream. Immediately as the pulp-stream passes the mean of space M, Fig. 8, its course changes to conform to the shape of part 38, and thereafter the two streams flow side by side. The arrows illustrate the course of the currents. The streams mingle only in the pipes 26', &c., where the two combined then constitute the pulp-stream for the following tank.

By forcing the pulp as near the table as possible the heavier particles can only be carried away by the lifting power of the current and not by its lateral effect. Although the velocity of the current is the same on all points of the area G B G, yet the current could move heavier particles from the neighborhood of G than it could lift from the neighborhood of B, and my calculations are necessarily made on the direct lifting power of the current, and I seek to construct my apparatus in such manner that the pulp is as much as possible guarded against this lateral effect of the current.

Figure 2:
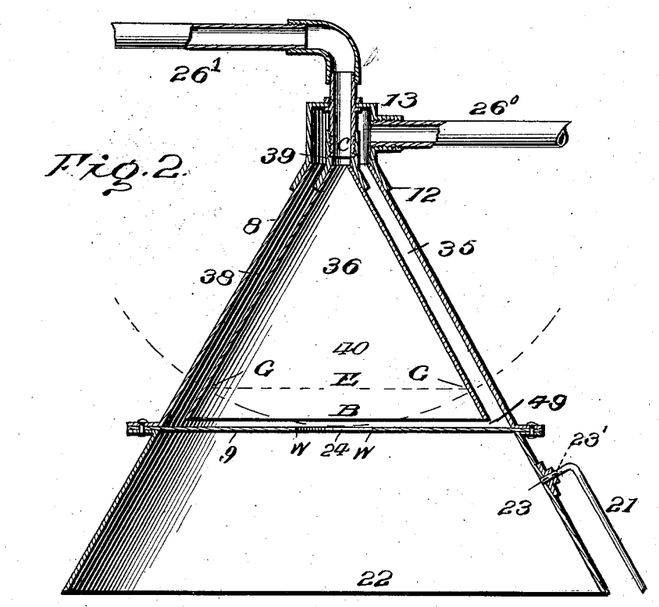
Fig. 2 is a detail in section of tank No. 1 and its immediate appurtenances.

The apparatus comprises a series of tanks 1, 2, 3, 4, 5, 6, and 7, (though the number may be varied,) each tank having two main chambers—i. e., the classifying-chamber 40 and the bin 22. All the classifying-chambers are of like construction, differing only in their proportions and increasing in their dimensions in progression from tank 1 to tank 7. All the bins 22 may be alike both in form and capacity. They should be large enough to hold a twenty-four-hour run. The tanks are preferably round in horizontal section. The parts 8, 10, and 11 are in the form of truncated cones, are of galvanized iron, and they are firmly and tightly secured together, it being requisite that the entire apparatus shall be water-tight and air-tight. The upper part 8 is riveted and soldered at 12 to the cast extension 13, and the lower part 11 is riveted and soldered to the cast extension 14.

15 is a source of fluid-pressure, consisting in that form of apparatus where water is used of an elevated water-tank with a ball-cock, whose function it is to hold the head of water at a constant level 19'.

Figures 6, 7, 9, 10, 11, 12:
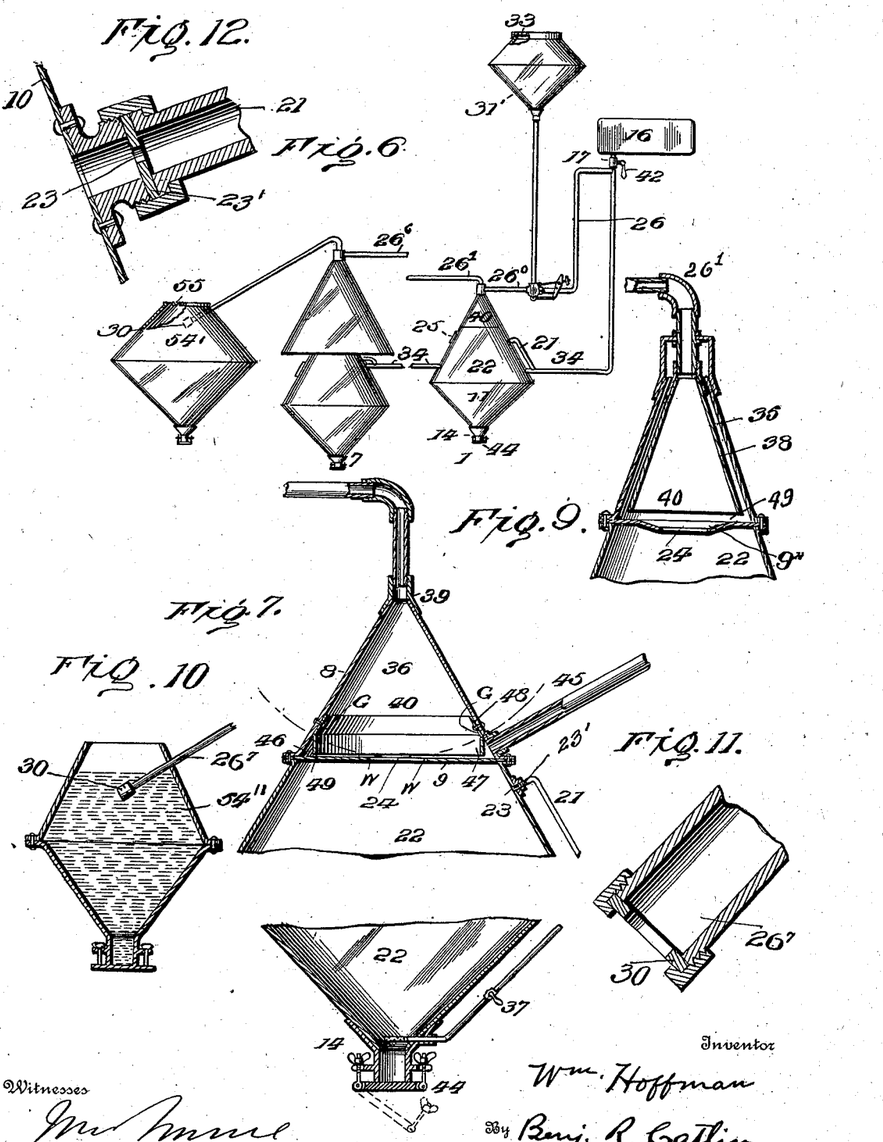
Fig. 6 shows a modification as adapted when air-pressure is employed.
Fig. 7 is a sectional view of a modification of Fig. 2, a part of the figure being broken away.
Fig. 9 is a sectional view of a tank with modified table depressed in the center.
Fig. 10 is a sectional view of a modified discharge-bin as may be used when air is the fluid employed.
Fig. 11 is an enlarged central sectional view of the foot-disk, the end of the pipe to which it is connected, and a screw-cap to removably hold the foot-disk in place.
Fig. 12 is a similar view of the disk in the lower part of the conduit and means for holding the disk removably in place.

In the modification indicated in Fig. 6 the source of pressure is an air-blower 16.

For operation with air the hopper 31' is provided with an air-tight cover 33, and the discharge from 30 is led into a suitable bin 54', provided with a strainer-top 55, that will let out the air and retain the product, or the discharge may be forced into a tank of water, 54'', Fig. 10. With air the classification can be carried farther than with water, since the infinitesimal particles can be made to deposit in air beyond the limit of operation in water. From the source of pressure Fig. 1 extends a pipe 17, which branches at 18, the lower branch 34 extending along the tanks, where it is connected by branch pipes 21 and 20 to the bins 22 of the several tanks. The upper branch 26° connects at 27 with the pipes 28 and 26, where it receives the pulp, and thence carries it through the head-disk 29 to and into tank 1, where it is joined by the stream from pipe 21 through openings 23 in disks 23' and openings 24 in the tables, and where, performing its function, it thence flows, combined with the stream from 21, through 26' to tank 2, and so on successively through all the tanks, to be discharged finally into a settling-tank at the foot-disk 30.

It is evident that the upper pipes 26° 26', &c., the lower pipe 34, with its branches 21 and 20, or either series of them, and the interposed tanks, which may be termed, generically, "enlargements," since they need not in all cases be tanks of just the form described, constitute a unitary "conduit." It is desirable, however, that the tanks be adapted to receive from the side and about equally from all sides a stream of pulp and fluid under pressure and from below a stream of fluid under pressure, there being an outlet from the top of each tank connected to an inlet at the top of the following tank for the unclassified part of the stream, and finally each tank must have a suitable space to receive separated material.

The head-disk 29 is a thin plate with an aperture introduced into the pipe to determine the amount of influx. The foot-disk 30 is a similar plate to control the efflux. The aperture of the head-disk 29 is made accurately to the initial transverse area of the pulp-stream, and the foot-disk 30 accurately to said area plus the transverse areas of the seven openings 23 in the disks 23'. The difference between the areas of the two disks 29 and 30 is the contribution to the pulp-stream of the seven openings in the disks 23'. Where the apparatus is operated without any clear stream, then the aperture in the foot-disk will be the same as in the head-disk.

The pipes in all cases are made reasonably larger in diameter than actually needed for the theoretical supply. The disks 23', 29, and 30 are in absolute control of the volume of the streams, and by means of these disks, coupled with enlarged pipes, I reduce friction and entirely overcome the effect on the stream of imperfections that are always found in cheap iron pipes. All the disks are so designed, constructed, and provided that they can be easily replaced by others with different-sized openings, thus to give more or less area to the streams, according as it may be desired to handle more or less tonnage or according to the character of the pulp to be handled, and thus making it convenient to adjust the tanks to any special service that might be required. These disks are made of emery, carborundum, or some such material, preferably of carborundum, and they are made after the manner of making emery-wheels. The employment of this hard material in the disks makes an important saving in wear and tear due to the hard materials, as quartz, always constituting a part of the pulp-stream. Ores in a quartz gangue cut like a file, even like a grindstone, on the apparatus by which they are being treated. If I should in place of my head-disk 29 employ a long iron pipe accurately bored to one inch, the wear on every inch throughout the entire pipe would be about equal to the wear on the first inch. By employing the enlarged pipe I reduce the current so much that there can be no considerable wear in the pipes, and by using these carborundum disks where the stream is most contracted and where the quartz sand would cut the most there remains but little wear at any place.

31 is the hopper through which the pulp to be classified is fed. The hopper is provided at the bottom with a small jet of water from pipe 50, which is adjusted to break down and discharge the pulp which will pack in the hopper in wet classification.

28 is a pipe into which the hopper feeds. This pipe is tapering, being larger at the bottom than at the top to prevent the ore from sticking within it.

25 is a window in the wall 10 of bin 22.

31', Fig. 6, shows a hopper with a tight cover 33 to be used where air-pressure is employed to prevent escape and loss of such pressure.

29 and 30, Figs. 4 and 5, are views, respectively, of the head-disk and the foot-disk.

35, Figs. 2 and 8, is a space through which the pulp-stream flows into the tanks at increasing area and diminishing velocity, owing to the form of space 35.

36 is a space through which the unclassified pulp-stream flows out of the tanks at decreasing area and increasing velocity, owing to the form of space 36.

24 is a space or opening through which passes an influx of fluid upward and through which fall into the bins 22 those particles of the pulp having resistance sufficient to overcome this influx.

Parts 37 are cocks in pipes 20, which are used at the beginning of an operation when the entire apparatus is to be filled with water only to expedite this filling, which otherwise would consume an undue interval of time, and for use in breaking down and discharging the ore, which will pack in the bins 22 in wet classification.

38 is an inner cone of galvanized iron forming the inner wall of spaces 35, riveted and soldered to a casting 39 and held in place by the pipe 26', which is screwed into said casting. The said inner cone by spreading the ore reduces interference of the particles and has the highly-important function of introducing the pulp-stream horizontally from the sides and equally from all sides.

Part 9 (designated "the table") in this case is flat, though it might be depressed in its center, as at 9", Fig. 9. It is made of galvanized iron and is fastened intermediate between parts 8 and 10. The pulp is delivered upon this table from space 35 about equally from all points of the compass and is pressed (we are operating under pressure) through the opening 49 into spaces 40 and 36. The heavier particles (here it is a matter of specific gravity) work themselves closest to the table and are most effectively presented to the action of the fluid influx through opening 24. The lighter particles are carried up and out as soon as the current can get beneath them.

Figure 3:
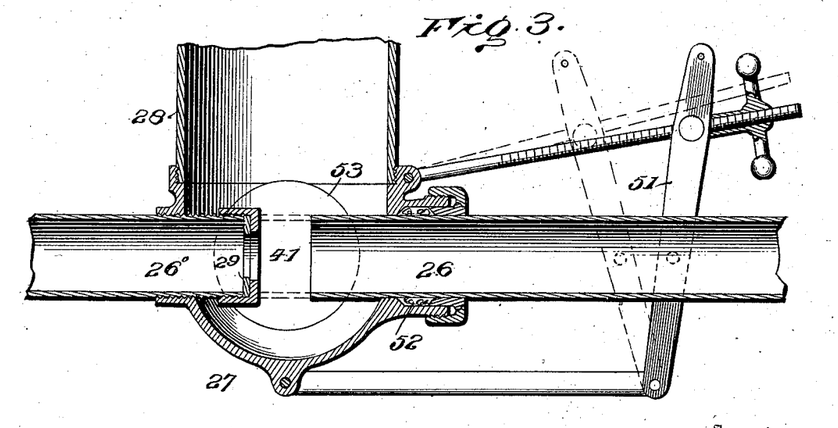
Fig. 3 shows the juncture of the pipes 28, 26, and 26°, also the situation of the head-disk 29, also the operation of the lever that moves pipe 26 in and out, either to shut off the ore or to adjust for the exact proportion of ore that is to be taken into the pulp-stream.

41 is an adjustable space between the inclosed ends of pipes 26 26° for regulating the proportion of pulp to water in the pulp-stream or for shutting off said pulp-stream.

37', 42, 43, and 54 are ordinary cocks.

44 indicates gates for opening the bins 22.

Line 19' indicates the head of water, and line 19 the normal level of discharge on which the classifier-battery, Fig. 1, is computed.

In the modification shown in Fig. 7 the pulp-stream is not brought into the tank at the top; but it is brought in, as indicated, through pipe 45, which pipe takes the place of pipe 26° of Fig. 2. 46 is a space entirely around the part 8, through whose entire volume the pulp-stream is pressed, the pulp entering about equally from all points of the compass onto the table similarly to the operation described for Fig. 2. This way of entering the pulp is an important feature of the improvement. 47 is a cylinder of galvanized iron with a flange 48 riveted and soldered to part 8. This modification, Fig. 7, replaces the inner cone 38 by the cylinder 47, and thus makes a saving and also requires a smaller tank; but the form given in Fig. 2 is truer to principle. It should be understood that the downwardly-expanding wall of bin 22 in this figure and the upwardly-expanding part of the wall of the same meet at their largest diameters and are tightly connected, forming a bin of the shape of the first bin 22 of Fig. 1.

In Fig. 2 the inner cone 38 and the opening 49 at the periphery of the table form the means for introducing the pulp to the table about equally from all points of the compass. In Fig. 7 the means for the same purpose is the cylinder 47, forming the annular space 46, and the opening 49 from said space, leading toward the center of the table.

51 is a screw-operated lever, with ball and socket. It serves to push the pipe 26 in and out of pipe-coupling 27 either to shut off the ore or to adjust the space 41. An important feature of the construction here is that when the ore is shut off the clear stream may continue to flow uninterruptedly.

52 is a stuffing-box through which pipe 26 is movable.

53 indicates a glass window.

54' is a bin for receiving the discharge from the foot-disk 30 when air is used.

54" is a modification of 54'.

55 is a strainer-top for bin 54' to let out the air and retain the ore.

G G, Fig. 2, represent the diameter of the classifying-chamber on the line G G.

W W represent the diameter of the opening 24.

The head of water is changed as desired by raising or lowering the discharge-aperture of pipe 26⁷. (See dotted lines 2.25' 4.50', &c., Fig. 1.) A hose may be used instead of the pipe. However, where air is used the raising or lowering of the discharge-aperture would have no significance.

Operation of the battery shown in Fig. 1: A sufficient water-supply being provided at 15, space 41, and cock 42 and the gates 44 being closed and cocks 43, 37', and 54 being open, open the cocks 37 and 42 to first fill all the tanks with water. When the lower disk 30 shall discharge, the tanks will be full. Then shut off cocks 37 and set 26⁷ to the level at which you intend to operate. Now turn in the pulp and adjust space 41, keeping the supply of ore at a uniform rate. When either of the windows 25 shows any bin 22 full to the lower edge of the window, then shut off the pulp by means of lever 51 and allow the clear water flowing through pipes 21 and 26 to continue. Immediately as the pulp is shut off the clear water fills into the bottom of the separating-chamber of tank No. 1 and rising carries the pulp-stream up and out of the chamber, and this clear water and the pulp-stream do not mingle within the chamber. In this case the pulp-stream lies upon the clear water. This action is repeated in all the chambers successively, and when then the discharge from the foot-disk 30 is clear the operation is completed. Now shut off cock 43 and open cocks 37 and draw off at 44 the finished products from all the bins. Waste no water at 44, but close off as soon as the bin is about empty. When all the bins have thus been drawn off, repeat the operation. The supply of water and ore being kept up, the apparatus works automatically and as rapidly as a stream through a conduit of given parts will flow a given distance under a given head. The speed of operation is here limited only by the "falling time" necessary for a perfect separation of the particles. To this end the tanks are so constructed that the exact separating area is only as though it were a single line for the current to pass. If, then, the current were brought abruptly into or taken abruptly out of this separating area, inertia would carry the particles through the area over the line without giving them sufficient falling time. For this reason I bring the current in with a gradually-decreasing velocity and take it out with a gradually-increasing velocity. This gives me the necessary falling time and leaves only an inappreciable inertia, and only so much time is here taken as is necessary for perfect work. Beyond this the current is made to flow with the greatest rapidity that other considerations will allow.

In my shape of apparatus the area of enlargement, which I call the "separating area," assumes the form of the convex surface of a segment of a sphere, G B G, Fig. 2, of which E B is the height, and G G is the diameter of the base, C being the center of the sphere. Every point of this convex area being equidistant from C, the current passing through this area will be of equal velocity at every such point, friction disregarded. After the pulp-stream has emerged through opening 49 it again decreases in velocity until it reaches the space M, Fig. 8, and from this latter onward it then increases. Immediately as the pulp flows out of 49 the particles of least resistance are diverted from the perpendicular, while the particles of sufficient resistance fall onto the table and are pressed along the table toward the aperture 24. As they thus move along most particles of less resistance are carried away, and by the time the flow reaches 24 I have remaining but few others than particles of greatest resistance, and these latter then fall through 24 into the bin 22. It will at this juncture be seen that my apparatus can be operated with the pulp-stream alone and without any clear stream whatever. In such a case I save about one-half the water and for some purposes obtain a sufficient product.

The velocities of flow in the different tanks are balanced as perfectly as the balance of a watch. Each tank will take out of the pulp those particles having the resistance power for which the tank is proportioned until finally at 30 we have the only roily discharge, and this will consist only of those particles which are so excessively fine that they will not settle within a practical limit of time. These particles are thence conducted into a series of settling-tanks, where a further classification may take place, or, if desired, the product from the settling-tank may be put again and again through the battery, each time at a decreased head, and it might for some purposes be thus subdivided ad infinitum.

There are many forms of classifiers with an inflowing pulp-stream from above and an inflowing clear-water stream from below, all based on the old Spitzkasten; but though necessarily somewhat similar no others are as perfect as mine, nor as effective, nor at all substantially like mine. My apparatus works with greater rapidity, with less water, with smaller cost, and with a precision beyond the powers of any other practical apparatus, and, moreover, it can be employed with any desired fluid, while I know of no other having this adaptability.

The proportions of the apparatus depend principally upon, first, the head of water; second, the mesh of the finest screen through which the pulp has passed, which determines the size of the largest particles remaining in the pulp; third, the amount of ore to be handled, and, fourth, the number and character of classes to be produced.

The seven-tank battery herewith shown is proportioned on head of water, ten feet; mesh, twenty-four to the inch; diameter of largest particle in mass to be classified, (the largest monometric particle that can pass a square mesh must be a cube,) one forty-seventh and one-half ($\frac{1}{47\frac{1}{2}}$) inch; diameter of head-disk 29, one inch; transverse area, seven hundred and eighty-five one-thousandths of an inch. A less head of water or a smaller pulp-stream will require smaller tanks, but will also give smaller results. Economy is greater with the larger sizes. The proportions are obtained in the following manner: The specific gravity of any right prism that will exactly counterbalance a column of water equals the height of the column divided by the height of the prism. With ten feet head of water and one forty-seventh and one-half ($\frac{1}{47\frac{1}{2}}$) inch height of the cubic particle I have ten feet—i. e., one hundred and twenty inches times forty-seven and one-half equals five thousand seven hundred, which would be the specific gravity of this cube if it would exactly counterbalance this column of water. The force of our column of water, which I call the "initial force," would thus be sufficient to raise any cubes of one forty-seventh and one-half ($\frac{1}{47\frac{1}{2}}$) inch or less in diameter and less than five thousand seven hundred in specific gravity. Now where a stream of water flows through a pipe having intermediate enlargements, as the tanks 1 2, &c., the velocity of the stream in these enlargements will be to its maximum velocity inversely as the transverse area of the pipe is to the transverse area of the enlargement.

The seven tanks 1, 2, 3, 4, 5, 6, and 7 shown are predicated, respectively, on specific gravities 7.5, 5.27, 3.70, 2.6, 1.83, 1.28, and 0.90.

Tank 1. To reduce the current in tank 1 to specific gravity 7.5, I find the coefficient $$\frac{5700}{7.5} = 760.$$

The head-disk 29 gives us for this tank an influx area of 0.785 inch, and 23 gives an influx area of 0.049 inch. There is no rigid rule for the size of the opening in disk 23'. Partly for mechanical reasons I have in the present case adopted a diameter one-fourth inch, area 0.049 inch. Being computed upon this basis, the force of the current at 24 and throughout 40 (in tank No. 1) will carry up and out any particles of pulp having less falling power than a cube one forty-seventh and one-half ($\frac{1}{47\frac{1}{2}}$) inch in diameter and 7.5 specific gravity, and the seven tanks are thus proportioned as follows:

Tank No. 1. Specific gravity 7.5, coefficient $\frac{5700}{7.5} = 760.$

By influx from pipe 26.. 0.785″
By influx from opening 23.. 0.049″×760= 37″  W W= 6.9″
Total efflux .......... 0.834″×760= 634″ G  G=27.5″

Tank No. 2. Specific gravity 5.27, coefficient $\frac{5700}{5.27} = 1082.$

By influx from pipe 26′.. 0.834″
By influx from opening 23 .. 0.049″×1082= 53″  W W= 8.2″
Total efflux .......... 0.883″×1082=955″ G  G=33.7″

Tank No. 3. Specific gravity 3.70, coefficient $\frac{5700}{3.70} = 1541.$

By influx from pipe 26″.. 0.883″
By influx from opening 23 .. 0.049″×1541= 76″  W W= 9.8″
Total efflux .......... 0.932″×1541=1436″ G  G=41.3″

Tank No. 4. Specific gravity 2.6, coefficient $\frac{5700}{2.6} = 2192.$

By influx from pipe 26‴.. 0.932″
By influx from opening 23 .. 0.049″×2192= 107″  W W=11.7″
Total efflux .......... 0.981″×2192=2150″ G  G=50.5″

Tank No. 5. Specific gravity 1.83, coefficient $\frac{5700}{1.83} = 3115$.

By influx from pipe 26^IV.. 0.981″
By influx from opening 23 .. 0.049″×3115= 153″ W W=14.0″
Total efflux.......... 1.030″×3115=3208″ G G=61.7″

Tank No. 6. Specific gravity 1.28, coefficient $\frac{5700}{1.28} = 4453$.

By influx from pipe 26^V.. 1.030″
By influx from opening 23 .. 0.049″×4453= 218″ W W=16.7″
Total efflux.......... 1.079″×4453=4805″ G G=75.6″

Tank No. 7. Specific gravity 0.90, coefficient $\frac{5700}{0.90} = 6333$.

By influx from pipe 26^VI.. 1.079″
By influx from opening 23. .. 0.049″×6333= 310″ W W=19.9″
Total efflux.......... 1.128″×6333=7144″ G G=92.2″

The spaces 35 are in this case made equal in the tanks and need only to be large enough to permit the passage of the pulp. If made larger, they will unnecessarily increase the size of the tank.

In hydraulics actual results in volume and velocity of flow are always less than the theoretical. This is usually compensated by employing a higher head, (friction head.) In my present problem it, on the other hand, happens that as any given substance weighs less in water than in air it will take less head to move the substance when it is immersed in water than if it were in air. These two conditions here measurably offset each other, and the exact head needed is easily obtained by adjusting the altitude of the foot-disk as provided, and thus tank No. 1 will produce a class of ore having at least the resistance power of a cubic particle one forty-seventh and one-half ($\frac{1}{47\frac{1}{2}}$) inch in diameter and 7.5 specific gravity. Tanks Nos. 2 3 4 5 6 7 will produce, respectively, classes from 5.27 to 7.5, 3.70 to 5.27, 2.6 to 3.70, 1.83 to 2.6, 1.28 to 1.83, and 0.90 to 1.28, while the smallest particles in each class will be purely of the heaviest mineral that the ore may contain.

If this battery is being used on galena in quartz, then tank No. 1 will produce pure galena. The values of all other tanks will depend on the richness of the ore. Tanks 2 and 3 can produce no particles of pure gangue. The largest particles from tanks 5, 6, and 7 will be pure gangue, and the smallest particles from every tank will always be pure mineral. If the ore is at all rich enough to handle, it will here give a finished concentration, even in tank No. 3, and beyond this we have classification. Beyond tank No. 4 the classes will all be about equal in percentage of values. They will differ principally in that the sizes of the particles will decrease from class to class, and as the larger sizes (pure gangue) decrease the smaller sizes (pure galena) decrease proportionally. These first three classes, though of large percentage in values, will generally be of small volume, while for the remaining tanks the volume will be large and the values small.

It will here be seen that whenever the product of any one tank is considered to be rich enough any preceding tanks may generally be dispensed with.

As before indicated, my apparatus may be used without any clear stream whatever, and even where the clear stream is used this stream is very small and only just sufficient to clean out finally the few lighter particles that escaped the pulp-stream. My apparatus practically works by the single stream, in some cases without aid, and at worst with but a small amount of added water. The stream at 24 is only just sufficient to finish the operation where perfect separation is wanted. The pulp-stream and the clear stream are of equal velocity on the separating area, and I thus obtain an accurately-adjusted balance. There is no point at which a particle could stop. Every particle must go either up or down, some faster, some slower, but all sure. There can be no line of equilibrium. The entire operation being under pressure, there can be no turmoil of waters anywhere. The pulp-stream coming through 35 at an increasing area, there is no sudden separation of the particles. The stream starting out at its maximum area, there is no sudden gathering together of the particles. If the apparatus were of glass and the pulp were a fine clean sand, the operation would look much like the action of particles of dust floating in a sunbeam, each particle, however, moving to its predetermined destination directly and surely.

I am aware that it has been proposed to construct ejectors and similar apparatus with pipes in line with each other, nearly meeting in a coupling-chamber, said pipes being relatively adjustable longitudinally to vary the space between the adjacent ends of said pipes, and this I do not claim except in a special combination forming a part of this improvement and including the hopper and the pipe leading therefrom to the pipe-coupling, as hereinbefore described.

I claim—

1. In an apparatus for classifying ore or the like, a source of fluid-pressure, a conduit comprising upper, pulp and fluid carrying, pipes, lower clear-fluid pipes, and intermediate tanks, all adapted to carry fluid under pressure, the tanks having tables onto the peripheries of which the ore is fed, the upper and lower pipes of the conduit being so connected with said tanks that the upper, combined pulp and fluid, stream and the lower clear-fluid stream meet in the tanks, the lower stream flowing vertically upward, whereby only particles of high resistance can fall into, or through, the lower stream, and whereby particles of lower resistance are carried upward and out of said tank, an outlet connecting the upper part of said tank to the next following tank, and so on for following tanks.

2. In an apparatus for classifying ore or the like, a source of fluid-pressure, a conduit comprising upper, pulp and fluid carrying, pipes, lower clear-fluid pipes, and intermediate tanks increasing in size from first to last, all adapted to carry fluid under pressure, the tanks having tables onto the peripheries of which the ore is fed, the upper and lower pipes of the conduit being so connected with said tanks that the upper, combined pulp and fluid, stream and the lower clear-fluid stream meet in the tanks, the lower stream flowing vertically upward, whereby only particles of high resistance can fall into, or through, the lower stream, and whereby particles of lower resistance are carried upward and out of the first tank, an outlet connecting the upper part of said tank to the next following tank, and so on for following tanks.

3. In apparatus for classifying ore and the like, the combination of a plurality of tanks arranged in series and of increasing size from first to last, and having a downwardly-expanding separating-chamber, means for introducing a stream, of material to be classified and of fluid, under pressure, to the separating-chamber of the smallest tank at its plane of greatest diameter, means for introducing fluid also under pressure to said tank at its bottom, a receptacle for classified material at the bottom of said tank, an outlet for the stream, of unclassified material and fluid, from the top of the first tank to an inlet at the top of the second tank, and a pipe connection for fluid under pressure to the bottom of the second tank, the tanks and connecting-pipes being closed from end to end of the series of tanks, whereby the stream is kept under continuous high pressure within the tanks and pipes, all this substantially as shown and described.

4. In apparatus for classifying ore and the like, the combination of a plurality of tanks arranged in series and of increasing size from first to last, means for introducing a stream, of material to be classified and of fluid, under pressure to the smallest tank, means for introducing fluid also under pressure to said tank at its bottom, a receptacle for classified material at the bottom of said tank, pipes connected to a source of fluid-pressure and to said receptacles below said tanks, an outlet for the stream, of unclassified material and fluid, from the top of the first tank to an inlet at the top of the second tank, and a pipe connection for fluid under pressure to the bottom of the second tank, outlets for classified material from the several receptacles, the tanks and connecting-pipes being closed from end to end of the series of tanks, all this substantially as shown and described.

5. In apparatus for classifying ore and the like, the combination of a conduit including a plurality of tanks arranged in series and of increasing size from first to last, and pipes connecting the tanks, the tank outer walls being in the form of truncated cones, the series of tanks and the connecting-pipes being closed from end to end of the series of tanks, means for introducing a stream, of material to be classified and of fluid, under pressure to the smallest tank at its upper end, means for introducing fluid also under pressure to said tank at its bottom, a receptacle for classified material at the bottom of said tank, an outlet for the stream of unclassified material from the top of the first tank to an inlet at the top of the second tank, and a pipe connection for fluid under pressure to the bottom of the second tank, substantially as shown and described.

6. In apparatus for classifying ore and the like, the combination of a plurality of tanks arranged in series and having separating-chambers of increasing size from first to last, means for introducing a stream, of material to be classified and of fluid, under pressure to the smallest tank at its upper end, means for spreading the inflowing stream consisting of an annular chamber through which said stream flows, said chamber being connected with the separating-chamber at its largest diameter, means for introducing fluid also under pressure to said tank at its bottom, a receptacle for classified material at the bottom of said tank, a table with central opening between the separating-chamber and said receptacle, an outlet for the stream of unclassified material from the top of the first tank to an inlet at the top of the second tank, and a pipe connection for fluid under pressure to the bottom of the second tank, substantially as shown and described.

7. In combination, a classifying-tank, provided with an inlet and an outlet pipe, and a thin perforated disk for each of said pipes, the perforations being smaller in diameter than the diameter of the respective pipes.

8. In combination, a classifying-tank, provided with an inlet and an outlet pipe, and a carborundum perforated disk for each of said pipes, the perforations being smaller in diameter than the diameter of the respective pipes.

9. The combination of a conduit consisting of upper pulp-carrying pipes, lower water-pipes, intermediate tanks having separating-chambers and storage-bins, a perforated disk in the upper pipe in advance of the first tank, the perforation in the disk being smaller than the bore of the pipe, a perforated disk at the outlet end of said upper pipe, the perforation in the latter being larger than that of the first disk, but smaller than the bore of the pipe.

10. A classifier-tank having a downwardly-expanding outer wall, a downwardly-expanding smaller wall within the outer wall, a pulp-carrying pipe connecting with the space between said walls, an outlet at the top of the upwardly-contracting separating-chamber within said inner wall, a table, with a central opening, below the inner wall, and below the space between the walls, a bin below the table, and a pipe for fluid under pressure communicating with said bin.

11. The combination of a plurality of classifier-tanks connected in series, an inlet-pipe common to all the tanks, and a disk in the inlet-pipe having a bore smaller than the pipe for controlling the flow and reducing friction in the pipe, a fluid-pressure pipe connected to the tanks, an outlet-pipe connecting with the top of the last tank, and a disk at the end of the outlet-pipe with perforation larger than that in the disk in the inlet-pipe, all substantially as shown and described.

12. In a classifier, the combination of the downwardly-expanding frusto-conical part, the table connected to said frusto-conical part, the top extension-casting to which said upper part is secured, the inlet-pipe for material to be classified connecting with the top casting, the outlet-pipe for unclassified material extending from said casting, a bin or extension below the table, an outlet for classified material therefrom, and means for supplying fluid-pressure to the classifier below said table, substantially as shown and described.

13. A classifier consisting of upper and lower frusto-conical parts forming an outer wall, said parts being secured tightly together, an inner frusto-conical part 38, an inlet-pipe, for material to be classified and fluid, a horizontal table, a fluid-inlet communicating with the lower part below the table, an outlet at the bottom for classified material, and an outlet at the top for the unclassified portion of the material, the passage to the outlet being a contracting one, whereby the outlet-stream will increase in velocity, substantially as shown and described.

14. A classifier consisting of an upper frusto-conical part, a table, a bin, said parts being secured tightly together, an inlet-pipe, for material to be classified and fluid, a fluid-inlet communicating with the lower part at its bottom, an outlet at the bottom for classified material, and an outlet at the top for the unclassified portion of the material, the passage to the outlet being a contracting one, whereby the outlet-stream will increase in velocity, and an inner frusto-conical part below the inlet for spreading the material as it passes to the lower part of the tank, substantially as shown and described.

15. A classifier consisting of an upper frusto-conical part, a table, a bin, said parts being secured tightly together, an inlet-pipe, for material to be classified and fluid, a fluid-inlet communicating with the bin below the table, an outlet at the bottom for classified material, an outlet at the top for the unclassified portion of the material, the passage to the outlet being a contracting one, whereby the outlet-stream will increase in velocity, said bin being of greater horizontal sectional area than the opening in the table, substantially as shown and described.

16. In an apparatus for classifying ore and the like, a source of fluid-pressure, a hopper, a conduit comprising upper, pulp and fluid carrying, pipes 26°, 26, a lower fluid-carrying pipe 34 and branches 21, intermediate tanks with which said upper pipes communicate and with which said branches 21 communicate by openings 23 so that their respective streams meet in the tanks, openings 23 being smaller than pipe 21, branches 20 from pipe 34 to the bottoms of the tank-bins, and cocks therein, substantially as shown and described.

17. In an apparatus for classifying ore and the like, a source of fluid-pressure, a hopper, a conduit comprising upper, pulp and fluid carrying, pipes 26°, 26, a lower fluid-carrying pipe 34 and branches 21, intermediate tanks with which said upper pipes communicate and with which said branches 21 communicate by openings 23 so that their respective streams meet in the tanks, a head-disk 29 in pipe 26° bored to the initial area of the pulp-stream, and a foot-disk 30 bored to the area of the bore of disk 29 plus the combined areas of openings 23, substantially as shown and described.

18. In an apparatus for classifying ore or the like, the combination of a plurality of tanks arranged in series and increasing in size from first to last, means for introducing the pulp-stream under pressure to the first tank, a table approximately horizontal and of large diameter to the outer edge of which the pulp is conducted, said table having an opening for depositing particles of the ore of resistance adapted to this tank, means for supplying fluid under pressure to each tank below such table, an outlet for pulp not deposited at the first tank connected to the next tank, and so on through the series, substantially as described.

19. In a classifier for ore and the like, a tank, a flat table therein having a central opening, means for feeding a pulp-stream under pressure to the table at its periphery and thence toward its center from all horizontal directions, whereby the particles of less resistance moving toward the center will be carried away, particles of higher resistance being deposited, and an outlet for the undeposited part of the pulp-stream, substantially as described.

20. In a classifier, an outer frusto-conical part expanding downward, an inner and smaller frusto-conical part, said parts forming a downwardly-expanding space 35, means for admitting pulp under pressure to said space 35 at its top, a separating-chamber 40 within the inner frusto-conical part, an outlet from the top of chamber 40, and the table, with a central opening, below space 35 and chamber 40, an opening from space 35 to said table adapted to feed material onto the table and thence toward its center and from different horizontal directions, and a fluid-pressure supply for the classifier.

21. The combination, in a classifier, of a conduit comprising upper and lower pipes, interposed tanks, a source of fluid-pressure connected to the conduit, a hopper, a pipe connecting the hopper to the upper pipe in advance of the first tank, a head-disk with an opening smaller than the bore of the upper pipe of the conduit between the pipe from the hopper and the first tank, a foot-disk in the conduit beyond the last classifier-tank, and disks between the several classifier-tanks and the lower pipe of the conduit, all said disks together controlling the pulp and fluid streams in the conduit, as set forth.

22. The combination, in a classifier, of a conduit comprising upper and lower pipes, interposed tanks, a source of fluid-pressure connected to the conduit, a hopper, a pipe connecting the hopper to the upper pipe in advance of the first tank, a head-disk with an opening smaller than the bore of the upper pipe of the conduit between the pipe from the hopper and the first tank, a foot-disk in the conduit beyond the last classifier-tank, and disks between the several classifier-tanks and the lower pipe of the conduit, all said disks being easily removable, whereby other disks with the same or different sized openings can be substituted, and all together controlling the pulp and fluid streams in the conduit, as set forth.

In testimony whereof I have signed this specification in the presence of two subscribing witnesses.

WILLIAM HOFFMAN.

Witnesses:
    LEWIS S. HILLS,
    H. S. YOUNG.